V. G. Arnold,
Egg-Beater,
N° 58,750.       Patented Oct. 16, 1866.
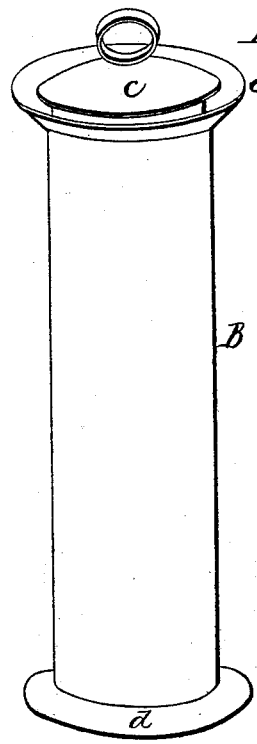
Fig. 1.
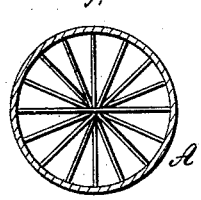
Fig. 3.
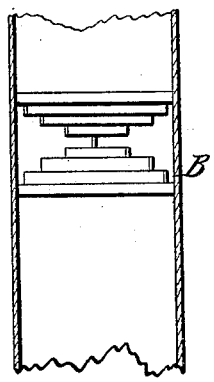
Witnesses,
Chas. Matteson
Lyman Upham
Inventor;
Varnum G. Arnold

UNITED STATES PATENT OFFICE.

VARNUM G. ARNOLD, OF PROVIDENCE, RHODE ISLAND.

IMPROVED EGG-BEATER.

Specification forming part of Letters Patent No. 58,750, dated October 16, 1866.

*To all whom it may concern:*

Be it known that I, VARNUM G. ARNOLD, of Providence, in the county of Providence and State of Rhode Island, have invented a new and Improved Egg-Beater; and I do hereby declare that the following is a full and exact description thereof, reference being had to the accompanying drawings, and to the letters of reference marked thereon.

In these drawings, Figure 1 is a perspective view of the egg-beater with the cover. Fig. 2$^A$ is a horizontal section of the egg-beater, with two sets of cutters, the upper set crossing the lower at right angles and touching them at the points of crossing. Fig. 2$^B$ is a vertical section of the same beater, showing the same arrangement of the cutters. Fig. 3$^A$ is a horizontal section of the egg-beater, with a series of cutters winding one above another at regular intervals, like a flight of winding stairs, each cutter, except the lowest, touching the one immediately beneath it, their points of contact being in the line of the axis of the cylinder of the beater. Fig. 3$^B$ is a vertical section of the same egg-beater, showing the arrangement of the cutters last described.

The purpose of my invention is to beat eggs thoroughly with the greatest speed and the least labor possible. To construct it I take a piece of tin about seven inches long by six inches wide, and, having first cut or punched in it the holes to receive the ends of the cutters, make it into a cylinder, B. The end of the cylinder intended for the bottom of the beater I make somewhat larger in diameter than the cylinder, thereby forming a foot, $d$, for the beater, and enabling it to stand firm. To the upper end of the cylinder I join a tunnel-shaped mouth, $e$, for convenience in breaking the shell of the egg and receiving its contents. I then make a cover, $c$, provided with a ring or knob, so that it may be easily removed, fitting closely into the upper end of the cylinder B. Lastly I insert the cutters, which are made of zinc or some other material not liable to corrode, through the holes cut in the sides of the cylinder, as above stated, and secure them in their proper position within the cylinder by soldering their ends into the cylinder. The holes in the sides of the cylinder above referred to are so cut as to permit the cutters to be inserted into the beater edgewise. The cutters are placed within the cylinder midway between the top and bottom and rest upon each other, so as to brace and strengthen each other. The cutters, instead of being soldered into the sides of the cylinder, may be inserted into a tin collar separate from the cylinder, and held in their position by wires connected with the cover.

What I claim as new, and desire to secure by Letters Patent, is—

The combination of the cylindrical can provided with a funnel-shaped mouth and a broad base with a series of cutters spirally arranged and fixed to the inside of the can, or to a rim fitting inside the can.

VARNUM G. ARNOLD.

Witnesses:
 CHAS. MATTESON,
 LYMAN UPHAM.